United States Patent [19]

Schultze et al.

[11] 4,173,302

[45] * Nov. 6, 1979

[54] PROCESS AND ALLOY FOR BRAZING ALUMINUM-CONTAINING ARTICLES

[75] Inventors: Werner Schultze, Bonn; Heinz Schoer, Alfter, both of Fed. Rep. of Germany

[73] Assignee: Vereinigte Aluminium-Werke Aktiengesellschaft, Bonn, Fed. Rep. of Germany

[*] Notice: The portion of the term of this patent subsequent to May 21, 1991, has been disclaimed.

[21] Appl. No.: 836,766

[22] Filed: Sep. 26, 1977

Related U.S. Application Data

[63] Continuation of Ser. No. 491,072, Jul. 15, 1974, abandoned, which is a continuation-in-part of Ser. No. 368,627, Jun. 11, 1973, abandoned, which is a continuation-in-part of Ser. No. 98,173, Dec. 14, 1970, abandoned.

[30] Foreign Application Priority Data

| Dec. 15, 1969 [DE] | Fed. Rep. of Germany | 1962760 |
| Jun. 11, 1970 [DE] | Fed. Rep. of Germany | 2028683 |
| Jul. 14, 1973 [DE] | Fed. Rep. of Germany | 2335940 |
| Mar. 18, 1974 [DE] | Fed. Rep. of Germany | 2412844 |

[51] Int. Cl.$^2$ .................. B23K 1/04; B23K 35/28
[52] U.S. Cl. ...................... 228/219; 228/221; 228/263
[58] Field of Search ............ 228/217, 219, 221, 263 F; 75/148

[56] References Cited

U.S. PATENT DOCUMENTS

| 2,774,686 | 12/1956 | Hodge | 428/653 X |
| 2,943,181 | 6/1960 | Gunow et al. | 228/217 X |
| 3,081,534 | 3/1963 | Bredzs | 75/148 X |
| 3,272,624 | 9/1966 | Quaas | 75/148 X |
| 3,355,281 | 11/1967 | Hansley | 75/148 X |
| 3,373,483 | 3/1968 | Miller | 228/221 |
| 3,395,001 | 7/1968 | Stroup | 228/263 F X |
| 3,415,697 | 10/1968 | Bredzs et al. | 228/241 |
| 3,673,678 | 7/1972 | Moreau et al. | 228/219 |
| 3,678,568 | 7/1972 | Knippenberg et al. | 228/263 X |
| 3,782,929 | 1/1974 | Werner | 228/263 F X |
| 3,811,177 | 5/1974 | Schoer et al. | 75/148 X |
| 3,898,053 | 8/1975 | Singleton, Jr. | 428/654 |

OTHER PUBLICATIONS

Schoer et al., German Printed Application 1,962,760, published 7/29/71.
Schoer et al., German Printed Application 2028683, published 12/16/71.
Schoer et al., German Printed Application 2143965, published 04/26/73.

Primary Examiner—Lowell A. Larson
Assistant Examiner—Kenneth J. Ramsey
Attorney, Agent, or Firm—Darby & Darby

[57] ABSTRACT

An aluminum-silicon base brazing alloy contains between 4 and 20 percent by weight of silicon and between 0.0001 and 1.0 percent by weight, preferably between 0.005 and 0.1 percent by weight, of at least one of the elements sodium, potassium and lithium. Optionally, the brazing alloy may further include between 0.01 and 10 percent by weight, preferably between 0.05 and 2 percent by weight, of at least one of the elements bismuth, strontium, barium and antimony as well as between 0.00001 and 1.0 percent by weight, preferably between 0.0002 and 0.1 percent by weight, of beryllium. The remainder of the alloy consists essentially of aluminum and impurities conditioned by production of the brazing alloy. The alloy is used for the fluxless brazing of aluminum-containing articles in substantially non-oxidizing atmospheres. The elements sodium, potassium and lithium make it possible to relax the requirements imposed on the brazing atmosphere from those imposed when using similar brazing alloys which, however, do not contain the last-mentioned elements.

10 Claims, No Drawings

PROCESS AND ALLOY FOR BRAZING ALUMINUM-CONTAINING ARTICLES

This application is a continuation of copending application Ser. No. 491,072, filed July 15, 1974, now abandoned, which was a continuation-in-part of application Ser. No. 368,627, filed June 11, 1973, now abandoned, which in turn was a continuation-in-part of then copending application Ser. No. 98,173, filed Dec. 14, 1970, now abandoned.

BACKGROUND OF THE INVENTION

The invention relates generally to the brazing of articles containing aluminum.

The German Auslegeschrift No. 1,962,760 discloses a brazing alloy consisting of 4 to 20 percent by weight of silicon and 0.01 to 10 percent by weight, preferably 0.05 to 2 percent by weight, of the elements of the group composed of bismuth, strontium, barium and antimony with the remainder consisting of aluminum and impurities due to the production of the alloy. This publication teaches the use of the brazing alloy as a filler metal for the fluxless brazing of aluminum-containing articles in a non-oxidizing atmosphere or in a low vacuum.

The German Offenlegungsschrift No. 2,143,965.6 also discloses a brazing alloy for the fluxless brazing of aluminum-containing articles which likewise consists of 4 to 20 percent by weight of silicon and 0.01 to 10 percent by weight, preferably 0.05 to 2 percent by weight, of the elements of the group composed of bismuth, strontium, barium and antimony with the remainder consisting essentially of aluminum and impurities due to the production of the alloy. The characteristic of this alloy resides in the fact that, instead of or together with the bismuth, strontium, barium and antimony, it contains beryllium in amounts of 0.00001 to 1.0 percent by weight and, preferably, in amounts of 0.0002 to 0.1 percent by weight.

The foregoing brazing alloys have been found to yield good results in practice. However, they possess the disadvantage that they impose relatively stringent requirements as regards the presence of a non-oxidizing atmosphere or a low vacuum during the brazing operation.

SUMMARY OF THE INVENTION

A general object of the invention is, therefore, to provide a novel process and a novel brazing alloy for the brazing of aluminum-containing articles.

A further object of the invention is to provide a process and brazing alloy which enable aluminum-containing articles to be brazed more economically than was possible heretofore.

Another object of the invention is to provide a process and brazing alloy which enable aluminum-containing articles to be brazed in a simpler manner than was possible until now.

An additional object of the invention is to provide a process and brazing alloy for brazing aluminum-containing articles which enable higher quality joints to be achieved than was possible heretofore.

It is also an object of the invention to provide a process and brazing alloy for brazing in a non-oxidizing atmosphere or in a low vacuum which enable the requirements imposed on the brazing atmosphere by the conventional brazing alloys to be lessened.

In accordance with the foregoing objects and others which will become apparent, the invention provides, as one of its features, in a process of brazing aluminum-containing articles, for the step of brazing the articles with an aluminum-silicon base brazing alloy which includes at least one substance selected from the group consisting of sodium, potassium and lithium. This permits a relaxation of the requirements imposed on the brazing atmosphere from those imposed when using similar brazing alloys which are free of sodium, potassium and/or lithium.

DESCRIPTION OF THE PREFERRED EMBODIMENTS

The brazing alloy according to the invention may include about 4 to 20 percent by weight of silicon, about 0.01 to 10 percent by weight, preferably 0.05 to 2 percent by weight, of at least one of the elements selected from the group composed of bismuth, strontium, barium and antimony and 0.00001 to 1.0 percent by weight, preferably 0.0002 to 0.1 percent by weight, of beryllium. It is also possible for at least one of the elements bismuth, strontium, barium and antimony to be present without beryllium or, conversely, for beryllium to be present without any of the elements bismuth, strontium, barium and antimony being present.

One of the important features of the invention resides in the presence of at least one of the elements sodium, potassium and lithium. The elements sodium, potassium and/or lithium may be present alone, that is, without the elements of the group composed of bismuth, strontium, barium, antimony and beryllium being present. Advantageously, however, the elements sodium, potassium and/or lithium are present together with one or more of the elements bismuth, strontium, barium, antimony and beryllium. The brazing alloy in accordance with the invention may contain about 0.0001 to 1.0 percent by weight of at least one of the elements selected from the group consisting of sodium, potassium and lithium. Preferably, the brazing alloy contains about 0.005 to 0.1 percent by weight of at least one of the elements of the group composed of sodium, potassium and lithium.

The remainder of the brazing alloy may consist entirely or predominantly of aluminum and impurities conditioned by the production of the brazing alloy, that is, conventional impurities.

According to the invention, the brazing alloy may be used for the fluxless brazing of aluminum-containing articles in a non-oxidizing atmosphere or in a low vacuum. A non-oxidizing atmosphere may be provided by blanketing the region of joining with a suitable protective gas. For instance, an inert gas such as argon may be used for this purpose. It is also possible to use other gases such as, for example, nitrogen and ammonia.

Research has shown that, when using the brazing alloy in accordance with the invention, it is no longer necessary to impose such stringent requirements on the oxygen content of the brazing atmosphere or on the degree of the vacuum used for brazing as were required heretofore. Simultaneously, the results achieved when using the invention are identical to or better than those achievable in accordance with the earlier-mentioned German publications.

The addition of alkali metals as according to the invention has been found to provide especially favorable effects as regards the corrosion-resistance of the brazed joint and, in particular, under those conditions where moisture has access to the joint. This is particularly true in those instances where, aside from one or more alkali metals, the brazing alloy additionally includes beryllium.

If the corrosion-resistance is denoted with values from 0 to 5 with the value 0 representing the ideal condition or, in other words, a condition which is practically inachievable, that is, with the value 0 representing the best corrosion-resistance and the value 5 representing the poorest corrosion-resistance, then the following values may be assigned to the test samples which were run: test samples with additions of beryllium and alkali metal, 1; test samples without beryllium but with alkali metal, 2; and test samples with neither beryllium nor alkali metal, 3.

It has been found advantageous when the total quantity of the alloying elements bismuth, strontium, barium, antimony, beryllium and sodium in the brazing alloy is at most about 10 percent by weight.

The appended Table sets forth several examples of brazing alloys according to the invention. It is self-understood that the compositions given are merely exemplary and are not intended to limit the invention. The values in the Table are in terms of weight percent and in all cases the remainder is essentially aluminum.

TABLE

|  | 1 | 2 | 3 | 4 | 5 | 6 | 7 | 8 | 9 | 10 | 11 | 12 |
|---|---|---|---|---|---|---|---|---|---|---|---|---|
| Silicon | 11.5 | 7.9 | 9.3 | 10.8 | 8.4 | 11.4 | 8.5 | 7.2 | 12.3 | 10.2 | 9.3 | 11.8 |
| Manganese | 0.06 | 0.04 | 0.09 | 0.07 | 0.03 | 0.05 | 0.03 | 0.08 | 0.02 | <0.01 | 0.07 | 0.01 |
| Magnesium | 0.03 | 0.04 | 0.03 | 0.06 | 0.06 | 0.03 | 0.05 | <0.01 | 0.02 | 0.04 | 0.03 | <0.01 |
| Iron | 0.36 | 0.35 | 0.35 | 0.036 | 0.037 | 0.34 | 0.48 | 0.07 | 0.24 | 0.19 | 0.42 | 0.09 |
| Titanium | 0.04 | 0.03 | 0.03 | 0.02 | 0.03 | 0.01 | 0.02 | <0.01 | 0.03 | 0.02 | 0.02 | 0.01 |
| Copper | 0.03 | 0.01 | 0.08 | 0.02 | 0.06 | 0.02 | <0.01 | 0.05 | 0.01 | 0.04 | <0.01 | 0.03 |
| Zinc | 0.05 | 0.10 | 0.07 | 0.05 | 0.04 | 0.04 | 0.01 | 0.11 | 0.06 | 0.02 | 0.14 | 0.09 |
| Bismuth | — | 0.12 | — | — | — | — | 0.35 | — | — | — | — | — |
| Amtimony | — | — | 0.23 | — | — | — | — | — | — | — | — | 0.08 |
| Strontium | — | — | — | 0.57 | — | — | — | — | — | — | — | — |
| Barium | — | — | — | — | 1.61 | — | — | — | — | — | — | — |
| Sodium | 0.007 | 0.031 | 0.012 | 0.065 | 0.047 | 0.005 | 0.018 | — | — | — | — | 0.007 |
| Potassium | — | — | — | — | — | — | — | 0.019 | 0.008 | — | 13 | 0.005 |
| Lithium | — | — | — | — | — | — | — | — | — | 0.065 | 0.028 | 0.009 |
| Beryllium | — | — | — | — | — | 0.0009 | 0.005 | — | 0.009 | — | 0.0007 | 0.0004 |

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. In the process of brazing aluminum-containing articles which comprises heating in contact with said aluminum articles an aluminum silicon filler metal, the improvement which comprises interposing between said articles an aluminum silicon base brazing alloy consisting predominantly of aluminum and containing from about 0.0001 to about 1% of at least one member selected from the group consisting of sodium, potassium and lithium, and from about 0.01 to 10% by weight of bismuth and from about 0.00001 to about 1.0% by weight of berylium maintaining said aluminum articles and said brazing alloy under a substantially non-oxidizing atmosphere comprising an inert gas atmosphere or a vacuum, brazing said articles with said alloy, and performing said brazing operation in the absence of a flux.

2. In the process of joining aluminum containing articles which comprises heating in contact with said aluminum articles an aluminum silicon filler metal, the improvement which comprises interposing between said articles an aluminum-silicon base brazing alloy consisting predominantly of aluminum and containing from about 0.0001 to about 1% by weight of a substance selected from the group consisting of sodium, potassium and lithium, from about 0.00001 to about 1.0% by weight of said brazing alloy of berylium, and from about 0.01 to 10% by weight of at least one material selected from the group consisting of bismuth, strontium, barium, and antimony, maintaining said aluminum articles and said brazing alloy under an inert gas atmosphere or under a vacuum, brazing said articles with said alloy, and performing said brazing operation in the absence of a flux.

3. A process as defined in claim 2 wherein said brazing alloy comprises substantially 0.005 to 0.1% by weight of said substance.

4. A process as defined in claim 2, wherein the elements of the group consisting of bismuth, strontium, barium and antimony constitute from about 0.05 to 2.0% by weight of said brazing alloy when at least one of said elements is present and said beryllium constitutes from about 0.002 to 0.1% by weight of said brazing alloy.

5. A process as defined in claim 2, wherein said brazing alloy comprises from about 4 to 20% by weight of silicon with the remainder consisting predominantly of aluminum and impurities conditioned by production of said brazing alloy.

6. In the process of joining aluminum containing articles which comprises heating in contact with said aluminum articles an aluminum silicon brazing alloy, the improvement which comprises interposing between said articles an aluminum silicon base brazing alloy containing from about 0.0001 to about 1% by weight of sodium and from about 0.00001 to 1.0% by weight of said brazing alloy of beryllium, maintaining said aluminum articles and said brazing alloy under a substantially non-oxidizing atmosphere comprising an inert gas or under a vacuum, brazing said articles with said alloy, and performing said brazing operation in the absence of a flux.

7. In the process of joining aluminum containing articles which comprises heating in contact with said aluminum articles an aluminum silicon brazing alloy, the improvement which comprises interposing between said articles an aluminum silicon base brazing alloy containing from about 0.0001 to about 1% by weight of potassium and from about 0.00001 to 1.0% by weight of said brazing alloy of beryllium, maintaining said aluminum articles and said brazing alloy under a substantially non-oxidizing atmosphere comprising an inert gas or under a vacuum, brazing said articles with said alloy, and performing said brazing operation in the absence of a flux.

8. In the process of joining aluminum containing articles which comprises heating in contact with said aluminum articles an aluminum silicon filler metal, the improvement which comprises interposing between said articles an aluminum silicon base brazing alloy containing from about 0.0001 to about 1% by weight of sodium, and from about 0.01 to 10% by weight of at least one material selected from the group consisting of bismuth, strontium, barium, and antimony, maintaining said aluminum articles and said brazing alloy under an inert gas atmosphere or under a vacuum, brazing said articles with said alloy, and performing said brazing operation in the absence of a flux.

9. In the process of joining aluminum containing articles which comprises heating in contact with said aluminum articles an aluminum silicon filler metal, the improvement which comprises interposing between said articles an aluminum silicon base brazing alloy containing from about 0.0001 to about 1% by weight of potassium, and from about 0.01 to 10% by weight of at least one material selected from the group consisting of bismuth, strontium, barium, and antimony, maintaining said aluminum articles and said brazing alloy under a substantially non-oxidizing atmosphere consisting essentially of an inert gas or a low vacuum, brazing said articles with said alloy, and performing said brazing operation in the absence of a flux.

10. The process of claim 9 wherein said inert gas is argon.

* * * * *